Feb. 6, 1968  R. T. PULS ET AL  3,367,059
FISH LURE
Filed June 3, 1965
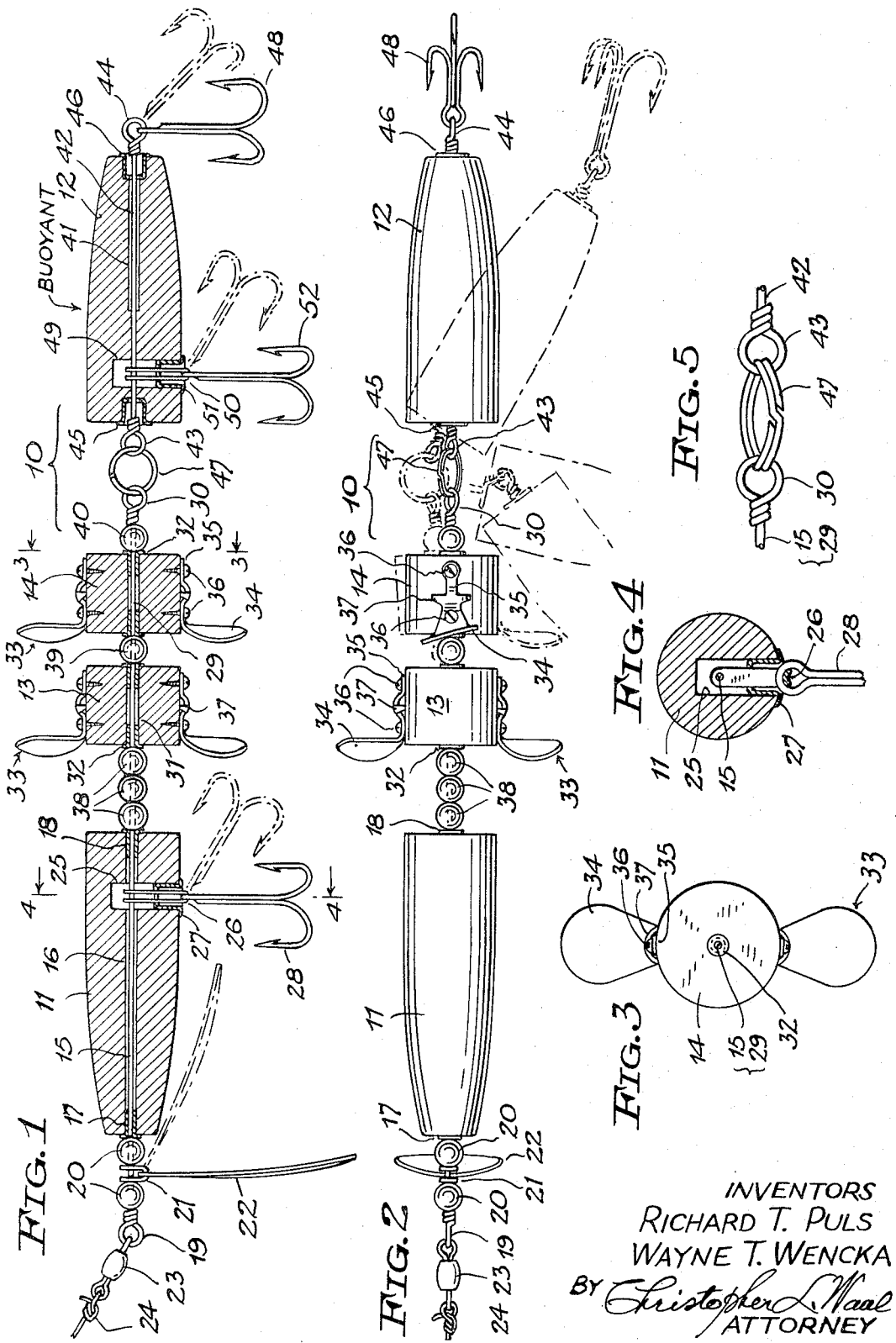
INVENTORS
RICHARD T. PULS
WAYNE T. WENCKA
BY Christopher L. Waal
ATTORNEY

United States Patent Office 3,367,059
Patented Feb. 6, 1968

3,367,059
FISH LURE
Richard T. Puls, 1508 W. Ramsey Ave., Milwaukee, Wis. 53221, and Wayne T. Wencka, 2224A N. 63rd St., Wauwatosa, Wis. 53213
Filed June 3, 1965, Ser. No. 460,921
1 Claim. (Cl. 43—42.14)

ABSTRACT OF THE DISCLOSURE

A fish lure having a resiliently flexible wire rod which carries a head member on its front portion and an intermediate member on its rear portion, the intermediate member having propeller vanes and being dynamically unbalanced so that its rotation imparts vibration and lateral deflection to the flexible rod. A second rod, carrying a tail member, is loosely connected to the rear end of the first rod so that the tail member is subjected to wobbling as a result of vibration and deflection imparted to the first rod by the intermediate member.

---

This invention relates to fish lures and more particularly to those of the articulated type.

An object of the invention is to provide an improved articulated or jointed fish lure which will have a vigorous oscillating or wobbling action when the line is retrieved or towed, and also when it is actuated by water current during river fishing.

Another object is to provide an articulated fish lure of this character which includes resiliently supported rotary propeller means at an intermediate region thereof for producing agitation and vibration during use of the lure.

A further object is to provide a fish lure which is suitable for catching game fish such as muskellunge.

The invention further consists in the several features hereinafter described and claimed.

In the accompanying drawing, illustrating a preferred embodiment of the invention, FIG. 1 is a longitudinal sectional elevational view of a fish lure constructed in accordance with the invention, rearwardly deflected positions of lure elements being indicated in broken lines;

FIG. 2 is a top plan view of the lure, laterally deflected positions of movable members of the lure being shown in broken lines;

FIG. 3 is a transverse sectional view taken generally on the line 3—3 of FIG. 1;

FIG. 4 is a transverse sectional view taken generally on the line 4—4 of FIG. 1, and FIG. 5 is a detail side view of a coupling connection forming a part of the lure.

In the drawing, the fish lure of the invention is indicated generally by the numeral 10 and comprises a series of connected body members or sections, namely a head member 11, a tail member 12, and a pair of intermediate members 13 and 14 forming tandem rotors, the several body members being formed of suitable material such as wood or plastic.

The head member 11 is of generally circular cross-section and is of elongated forwardly tapering conical or conoidal shape, the length of this member being several times as great as the diameter. A resilient wire shaft or rod 15, such as of music wire, is secured longitudinally in the head member, the shaft extending through an axial bore 16 in the head member fittting in terminally flanged metal bushings 17 and 18 pressed or cemented in the opposite ends of the bore. The head member is either fixed on the shaft 15 or free to turn thereon. The wire shaft 15 is provided with a front towing eye 19 spaced forwardly of the front end of the head member, and between this eye and the head member the shaft is threaded through a pair of spaced spherical beads 20, such as of plastic, and through the apertured leg ends of a clevis 21 disposed between the beads and free to turn on the shaft. A rearwardly swingable spoon-like spinner 22 of shiny metal is loosely suspended on the clevis, and is free to swing rearwardly thereon during the use of the lure. A swivel 23 is connected to the towing eye 19 and is adapted to have a fishline or leader 24 attached thereto.

The rear portion of the head member has formed therein a downwardly opening radial bore 25 intersecting the longitudinal bore 16 of this member. A clevis 26 extends vertically in the bore 25 and has apertured upper leg ends through which the wire shaft extends, thus suspending the clevis from the shaft. The lower portion of the clevis 26 passes through a terminally flanged hat-shaped bushing 27 pressed or cemented in the lower end of the bore 25. A fishhook 28 of the gang or treble type is suspended from the bight portion of the clevis 26 and is swingable rearwardly thereon when the lure is in use, as indicated in the broken lines. The spinner 22 will swing rearwardly on its clevis 21 when the lure is in use, as indicated in broken lines, and will either flutter or oscillate below the head member or orbit around the tapered front end portion of the head member, depending on the towing or retrieving speed. The fishhook 28 is spaced sufficiently rearward of the spinner 22 to avoid interference with the spinner.

The resilient wire shaft 15 has a rear portion 29 which projects a considerable distance from the rear end of the head member 11 to form a laterally deflectable cantilever arm and terminates in an eye 30 to which the tail member 12 is loosely coupled, as hereinafter described. The two tandem rotor members 13 and 14 have respective axial bores 31 therethrough and are rotatably mounted on the resilient wire shaft portion 29 to turn freely thereon. For this purpose each rotor member is bushed, preferably by means of terminally flanged metal end bushings 32 which are pressed or cemented in the opposite ends of the bore 31. The resilient shaft portion 29 passes loosely through the bushed rotor members so that these members will be free to turn even when the shaft becomes bowed incident to its lateral flexure. The rotor members are of cylindrical shape and each has substantially the same diameter as the rear portion of the head member and a length about equal to its diameter. Each rotor member carries thereon a pair of diametrically opposite propellers 33 of shiny metal each with a generally radial blade or vane portion 34 and a rearwardly bent base portion 35 rigidly secured as by screws 36 to the cylindrical periphery of the rotor member. The base portion 35 is provided with arched bracing projections 37 at opposite sides. The forward rotor member 13 is spaced rearwardly from the head member by a series of spherical plastic beads 38 strung on the resilient wire shaft 15, thus avoiding interference between the propeller blades of this rotor member and the fishhook 28 swingably suspended on the head member. The two rotor members 13 and 14 are spaced by an intervening spherical plastic bead 39 strung on the wire shaft. Another similar bead 40 is strung on the shaft between the rear end of the rear rotor member and the rear terminal eye 30 of the shaft. The several spacing beads also serve to reduce friction on the rotor members. The rotors are slightly unbalanced, thus enhancing a vibratory effect during their rotation.

The tail member 12, which is buoyant, has generally circular cross-section and includes a cylindrical front portion and a rearwardly tapered frusto-conical rear portion, the front portion being of substantially the same diameter as the rotor bodies. A bore 41 is formed axially through the tail member and receives therethrough a wire shaft 42 with front and rear eyes 43 and 44. The front end portion of the shaft passes through a transversely flanged bushing 45 pressed or cemented in the front end of the bore 41, and the rear end portion of the shaft passes through a similar bushing 46 fixedly secured in the rear end of the lure. The front eye 43 of the shaft 42 is loosely connected to the rear eye 30 of the resilient front shaft 15 by a coupling loop or link 47 in the form of a split key-ring having two convolutions, as seen in FIG. 5. This coupling member will not only permit easy attachment and detachment of the tail member but will also permit a wide range of swinging travel of the tail member in all directions and a considerable lateral deflection of the front end of the tail member with respect to the rear eye 30 of the front shaft 15. The rear eye 44 of the tail member shaft has suspended therefrom a rearwardly swingable fishhook 48, preferably of the treble type. The tail member has formed therein near its front end a downwardly opening radial bore 49 which intersects the longitudinal bore in this member. A clevis 50 extends vertically in the bore 49 and has apertured upper leg ends through which the shaft 42 extends, thus suspending the clevis from the shaft. The lower portion of the clevis passes through a terminally flanged bushing 51 pressed or cemented in the lower end of the bore 49. A fishhook 52 of the treble type is suspended from the bight portion of the clevis 50 and is swingable rearwardly thereon when the lure is in use. The two fishhooks 48 and 52 swingably carried by the tail member are spaced a sufficient distance apart to avoid interference with each other.

By way of example, for a lure suitable for catching large game fish such as muskellunge, the length of the lure from the front end of the head body to the rear end of the tail body may be about 11 inches, and the diameter of the lure bodies or members may be about 1 inch. The several lure bodies may be suitably decorated or finished, as is well understood in this art. The extended lure will fit in a conventional tackle box, but in some instances the tail member 12 may be folded forwardly on its coupling connection, as indicated by broken lines in FIG. 2, to provide greater compactness. It is also possible to detach the tail member, and in some instances to substitute other forms of oscillatory tail members such as a bucktail.

For a lure suitable for catching smaller fish, the size of the lure may be reduced.

In use, the fish lure is cast by the fisherman and is then retrieved. On the fast retrieve, the lure skims along the water surface in a partially submerged condition, the vaned rotors 13 and 14 being caused to rotate and producing noises and vibration, and the tail member 12 wobbling vigorously from side to side, thus attracting fish in the vicinity. The projecting rotor-carrying rear end portion 29 of the resilient wire shaft 15 is free to deflect and vibrate laterally during this action. On a slower retrieve the lure will remain below the water surface, but the buoyant tail member will prevent excessive sinking of the lure.

It will be understood that the lure may also be used for trolling, the speed of the boat being selected to produce surface action or submerged action of the lure.

The lure may also be used as a part of a so-called river rig in which the lure is connected by a leader to a sinker-anchored fishline to hold the lure in a selected submerged position spaced above a river bottom, whereupon the river current will urge the captive lure in downstream direction and actuate the lure.

We claim:

1. In a fish lure, the combination of a resiliently flexible wire rod having front and read ends provided with front and rear eyes, the front eye being adapted for connection to a fishing line, a forwardly tapered substantially elongated conoidal head member rotatably positioned on the front end portion of said rod and having a fish hook suspended therefrom, anti-friction beads and an intermediate spoon-like spinner rotatably positioned on said rod between said front eye and the front end of said head member, at least one intermediate member rotatably positioned on the rear end portion of said rod, said intermediate member comprising a substantially cylindrical hub of substantially the same diameter as the rear end of the head member with a length substantially equal to its diameter, and a set of radial propeller vanes provided on said hub for imparting rotation thereto when the lure is drawn through water, anti-friction beads positioned on said rod between said head member and said intermediate member and said rear eye, said intermediate member being dynamically unbalanced and imparting vibration and lateral deflection to the rear end portion of said rod when the intermediate member is rotating, a second wire rod having front and rear ends provided with eyes, the front eye of said second rod being loosely connected to the rear eye of the first mentioned rod, an elongated tail member of substantially the same diameter as said intermediate member rotatably positioned on said second rod, and a fish hook connected to the rear eye of the second rod, the loose connection between the first and second rods permitting said tail member to wobble vigorously as a result of vibration and lateral deflection imparted to the rear end portion of the first rod by rotation of said unbalanced intermediate member of the lure.

References Cited

UNITED STATES PATENTS

| | | | |
|---|---|---|---|
| 671,613 | 4/1901 | Shakespeare et al. | 43—42.14 |
| 972,748 | 10/1910 | Breder et al. | 43—42.14 |
| 1,140,279 | 5/1915 | Myers | 43—42.14 |
| 1,610,204 | 12/1926 | Donholt | 43—42.16 |
| 1,698,736 | 1/1929 | Roberts | 43—42.39 X |
| 2,306,640 | 12/1942 | Nelson | 43—42.14 |

SAMUEL KOREN, *Primary Examiner.*

D. J. LEACH, *Assistant Examiner.*